US007052755B2

(12) United States Patent
Sasaki et al.

(10) Patent No.: US 7,052,755 B2

(45) Date of Patent: May 30, 2006

(54) SHEET-LIKE ADHESIVE LABELS, METHOD OF ATTACHING SAID ADHESIVE LABELS, DIALS, METHOD OF MANUFACTURING DIALS AND TIMEPIECES

(75) Inventors: Shigemi Sasaki, Chino (JP); Yoshimitsu Misawa, Okaya (JP)

(73) Assignee: Seiko Epson Co., Tokyo (JP)

( * ) Notice: Subject to any disclaimer, the term of this patent is extended or adjusted under 35 U.S.C. 154(b) by 118 days.

(21) Appl. No.: 10/460,661

(22) Filed: Jun. 13, 2003

(65) Prior Publication Data

US 2004/0058115 A1 Mar. 25, 2004

(30) Foreign Application Priority Data

Jun. 13, 2002 (JP) ............................. 2002-172775
Jun. 13, 2002 (JP) ............................. 2002-172776

(51) Int. Cl.
*B32B 3/00* (2006.01)

(52) U.S. Cl. .................... 428/40.1; 428/41.3; 428/41.5; 428/42.1; 428/42.2; 428/42.3; 428/202; 428/203; 428/913; 428/914

(58) Field of Classification Search ............... 428/40.1, 428/41.3, 41.5, 42.1, 42.2, 42.3, 202, 203, 428/913, 914
See application file for complete search history.

(56) References Cited

U.S. PATENT DOCUMENTS 6,116,774 A * 9/2000 Sasaki et al. ............... 368/280

FOREIGN PATENT DOCUMENTS

| | | |
|---|---|---|
| JP | H1-316485 A | 12/1989 |
| WO | WO 9905233 | 2/1999 |

* cited by examiner

*Primary Examiner*—Nasser Ahmad
(74) *Attorney, Agent, or Firm*—Shinjyu Global IP Counselors, LLP

(57) ABSTRACT

A bonding agent having an adhesive and a curing agent is formed on a bonding surface of a dial member. A transfer sheet is attached to a convex side of the dial members, and a release sheet is attached to its bonding agent side to form a dial label. When this dial label is attached to a dial base, the release sheet is peeled off and the dial label is attached to the dial base. The transfer sheet is peeled off together with the excess of the bonding agent, and then the bonding agent is cured by a curing agent. Since the bonding agent in the peripheral portions of the dial members is cured while bonding force is maintained, there is no adherence of fine particles of foreign matter, and a satisfactory appearance can be obtained.

3 Claims, 8 Drawing Sheets

SHEET-LIKE ADHESIVE LABELS, METHOD OF ATTACHING SAID ADHESIVE LABELS, DIALS, METHOD OF MANUFACTURING DIALS AND TIMEPIECES

TECHNICAL FIELD OF THE INVENTION

The present invention relates to sheet-like adhesive labels and a method of attaching the adhesive labels. Specifically, the present invention relates to sheet-like adhesive labels having, for example, letters or other such decorative components that are used for decorating a dial and structured into an adhesive label. The present invention also relates to an attaching method for attaching the sheet-like adhesive labels to, for example, a dial base or other such adherend.

The present invention also relates to dials, a method of manufacturing dials, and timepieces. Specifically, the present invention relates to dials having letters or other such decorative members on the surface, a method of manufacturing the dials, and timepieces having the dials.

BACKGROUND ART

In conventional practice, a method of structuring an attachment member into an adhesive label and attaching it to an adherend is known as a method for attaching an attachment member. For example, when the dial of a timepiece is decorated with letters or other such decorative components, a sheet-like adhesive label with a three-layer structure is made by applying an adhesive to the back of the decorative component attaching a release paper to the bottom of the adhesive, and attaching a transfer sheet on top of the decorative component. When decorative components include a plurality of components separated from each other, as do the letters on the dial of the timepiece, the transfer sheet is still coated with an adhesive in parts between the decorative components, which are devoid of such decorative components. When the decorative components are attached to the dial, the release paper is peeled off, the adhesive is attached to the dial, and the transfer sheet is peeled off to transfer the decorative components to the dial. Water-soluble adhesives, which adjust their adhesiveness by evaporating the water, solvent-based adhesives, which adjust their adhesiveness by volatizing the solvent, adhesives, which adjust their adhesiveness by irradiation with ultraviolet rays (UV), and the like are usually used as such adhesives.

When the transfer sheet is peeled off, the adhesive coated on the parts of the transfer sheet devoid of decorative components is peeled off together with the transfer sheet. However, the layer of adhesive coated on the back of the decorative components is exposed in the peripheral portions of the decorative components after the transfer sheet is peeled off, which may cause fine particles of foreign matter to adhere to the adhesive, and may cause an adverse effect on the appearance of the dial. Furthermore, the adhesive coated on the parts devoid of decorative components may remain on the adherend. Methods of dipping a thin cotton swab in a solvent and using the cotton swab for wiping off the particles have been conceived in order to remove such small particles of foreign matter. However, with this method, not only does the number of operations increase, but also the dial is sometimes dirtied because the solvent leaves filamentous traces in the adhesive. Furthermore, contact with a cotton swab or the like may cause the adhesive to move. As a result, the decorative components may be misaligned or removed, or other undesirable changes may occur. Also, the solvent forms stains if it is not completely removed after cleaning.

A method of removal by blowing air on the dial is also known. But even with this method it is still difficult to reliably remove the foreign matter adhered to the adhesive.

A need therefore exists for sheet-like adhesive labels, methods of attaching the labels, dials, methods of manufacturing the dials, and timepieces, which are capable of overcoming prior-art problems such as those described. This invention was created to satisfy such a need of the prior art and to satisfy other needs, which will be made apparent to those skilled in the art by the disclosure that follows.

SUMMARY OF THE INVENTION

A purpose of the present invention is to provide a sheet-like adhesive label and a method of attaching the label, wherein an adherend with a satisfactory appearance can be obtained without any foreign matter adhering to the peripheral portion of an attachment member. Another purpose of the present invention is to provide a dial that has a satisfactory appearance, a method of manufacturing the dial, and a timepiece having the dial without any foreign matter adhering to the peripheral portions of the decorative components.

The sheet-like adhesive label of the present invention is adapted to be bonded to at least one surface of an adherend, having an attachment member, a transfer sheet, and a release sheet. The attachment member has a bonding portion adapted to be attached to the surface of the adherend. The release sheet is attached to the top of the bonding portion of the attachment member. The transfer sheet is attached to the surface of the attachment member opposite from the side provided with the release sheet, wherein the bonding portion includes adhesion means for attaching the attachment member to the adherend, and irreversible phase transition means for irreversibly phase-transforming at least part of the adhesion means to a solid state by setting or curing.

As used herein, "setting" refers to the solidification of a bonding portion by removing the water or solvent. Also, "curing" refers to the solidification of a bonding portion by a polymerization reaction. Such curing includes, for example, photocuring involving solidification by irradiation with ultraviolet rays (UV) or the like, or heat-curing involving setting by heating, irradiation with heat rays, or the like.

In a sheet-like adhesive label with this structure, the attachment member is satisfactorily bonded to the adherend by the adhesive means, which constitutes the bonding portion. Also, since at least the area of the bonding portion positioned in the peripheral portion of the attachment member can be phase-transformed to a solid state by the irreversible phase transition means while a satisfactory bonding force is maintained by the adhesive means, minute particles of foreign matter do not adhere to the bonding portion after the phase transformation, and the appearance of the adherend is satisfactory.

Unlike in conventional practice, the steps for manufacturing the adherend are also simplified because the sheet-like adhesive label with this structure eliminates the need for a step of wiping the adherend with a solvent or the like following the attachment to the attachment member or other such types of steps.

The adhesion means is preferably of a solvent-based self-bonding type, which adjusts the adhesiveness by volatizing the solvent, a water-soluble self-bonding type, which adjusts the adhesiveness by evaporating the water, or of a UV self-bonding type, which adjusts the adhesiveness by irradiation with ultraviolet rays (UV).

In the sheet-like adhesive label with this structure, the adhesive label can be attached to the adherend in a simple and reliable manner because the adhesive means allows its adhesiveness to be adjusted by conducting the respective predetermined processing. These predetermined processings refer to, for example in the case of an adhesive means of the solvent-based self-bonding type or water-soluble self-bonding type, letting the bonding portion that is coated on the attachment member stand for a specified time, or promoting volatization of the solvent or evaporation of the water by heating, and other such methods. In the case of an adhesive means of the UV self-bonding type, these types of processing refer to irradiation with a specific amount of ultraviolet rays (UV). Thus, the adhesiveness of the bonding portion can be easily adjusted, and the attachment member is satisfactorily bonded to the adherend.

In the sheet-like adhesive label of the present invention, the irreversible phase transition means is preferably of either a UV curing type curing agent, which effects curing by irradiation with ultraviolet rays (UV), or a heat-curing type setting agent, which effects curing by heating.

In the sheet-like adhesive label with this structure, the bonding portion can be set in a desired period of time by conducting respective predetermined processing. For example, if these types of processing are used in a state in which the attachment member is bonded to the adherend, the bonding portion can be set while maintaining satisfactory bonding strength between the attachment member and the adherend. Therefore, foreign matter can be easily and reliably prevented from adhering to the peripheral portion of the attachment member. As used herein, predetermined processing refers to irradiation with a specific amount of ultraviolet rays (UV) when an irreversible phase transition means of the UV curing type is used. The predetermined processing refers to heating at a specific temperature when an irreversible phase transition means of the heat-curing type is used. Such processings make it possible to easily solidity the bonding portion.

The method for attaching a sheet-like adhesive label as described above to an adherend is characterized in that the release sheet of the sheet-like adhesive label is peeled off, the exposed surface of the bonding portion is attached to the adherend with the adhesive as a result of peeling off the release sheet, the transfer sheet is peeled off from the attachment member, and the bonding portion between the adherend and the attachment member is irreversibly phase-transformed to a solid state.

In the method of attaching the sheet-like adhesive label in this method, the attachment member formed on the sheet-like adhesive label is transferred to the adherend by the adhering force of the bonding portion. Then, the bonding portion is phase-transformed from a fluid state to a solid state. Therefore, the attachment member is then affixed to the adherend while maintaining a satisfactory bonding force. Since the bonding portion is phase-transformed to a solid state, the attachment member maintains a satisfactory appearance without fine particles of foreign matter adhering to the peripheral portion thereof. Thus, unlike in conventional practice, operations for cleaning the foreign matter off with a solvent or the like are unnecessary, and the steps for manufacturing the adherend are simplified.

Alternatively, the method for attaching such a sheet-like adhesive label to an adherend is characterized in that the release sheet of the sheet-like adhesive label is peeled off, the surface of the bonding portion that is exposed after the release sheet is peeled off is attached to the adherend with the adhesive, the bonding portion between the adherend and the attachment member is irreversibly phase-transformed to a solid state, and the transfer sheet is then peeled off from the attachment member.

In the method of attaching the sheet-like adhesive label, the attachment member formed on the sheet-like adhesive label is transferred to the adherend by the adhering force of the bonding portion. The bonding portion is then irreversibly phase-transformed to a solid state prior to peeling off the transfer sheet. In other words, the bonding portion is phase-transformed to a solid state while the attachment member is protected by the transfer sheet. Therefore, foreign matter is more reliably prevented from adhering.

There may also be cases in which, for example, the bonding portion is not only provided to the bonding surface of the attachment member, but is also provided continuously in the part of the transfer sheet devoid of the attachment member. Particularly in this case, the transfer sheet is peeled off after the bonding portion is phase-transformed to a solid state, so the part of the bonding portion devoid of the attachment member does not adhere to the adherend, and no excessive parts of the bonding portion remain on the adherend. Therefore, a satisfactory appearance is maintained.

Another feature of conventional practice is that the bonding portion in the peripheral area of the attachment member is sometimes difficult to separate when the transfer sheet is peeled off, with the bonding portion remaining on the peripheral portion of the attachment member. In the method of attaching a sheet-like adhesive label of the present invention, the bonding portion has already undergone a phase transition to a solid state when the transfer sheet is peeled off. Therefore, the bonding portion is easily separated in the peripheral portion of the attachment member without being elongated, and the bonding portion does not protrude in the peripheral portion of the attachment member. This results in a satisfactory appearance. Particularly when a UV curing type is used as the irreversible phase transition means, semi-curing is performed because it is difficult to expose the bonding portion between the attachment member and the adherend to ultraviolet rays (UV). By contrast, the bonding portion in other areas where the attachment member is not disposed is completely cured. Therefore, the bonding portion in the peripheral portion of the attachment member is satisfactorily separated when the transfer sheet is peeled off.

The dial of the present invention includes a dial base and a decorative component bonded to the dial base via a bonding portion. The bonding portion includes an adhesive for bonding the decorative component to the dial base, and an irreversible phase transition agent capable of irreversibly phase-transforming the bonding portion to a solid state by setting or curing. The irreversible phase transition agent allows at least the peripheral portion of the bonding portion to be set.

In the dial with this structure, the decorative component is satisfactorily bonded to the dial base by the adhesive that constitutes the bonding portion. Also, either the entire bonding portion or the portion of the bonding portion positioned in the peripheral portion of the decorative component can be phase-transformed to a solid state by the irreversible phase transition agent while a satisfactory bonding force is maintained by the adhesive. Therefore, the appearance of the dial remains satisfactory without the adherence of fine particles of foreign matter to the bonding portion after the phase-transformation.

The manufacturing processes are simplified because there is no need to clean off fine particles of foreign matter with a solvent or the like or to perform other steps for the dial with this structure, unlike in conventional practice.

The adhesive used in this case is preferably a solvent-based self-bonding adhesive, which adjusts its adhesiveness by volatizing the solvent, a water-soluble self-bonding adhesive, which adjusts its adhesiveness by evaporating the water, or a UV self-bonding adhesive, which adjusts its adhesiveness by irradiation with ultraviolet rays (UV).

The dial with this structure can be manufactured easily and reliably because the adhesiveness thereof can be adjusted by performing a predetermined processing. The predetermined processing refers to, for example, letting the bonding portion coated on the attachment member stand for a specified time, promoting volatization of the solvent or evaporation of the water by heating, and other such methods in the case of an adhesive of the solvent-based self-bonding type or water-soluble self-bonding type. In the case of an adhesive of the UV self-bonding type, the predetermined processing refers to irradiation with a specific amount of ultraviolet rays (UV). Thus, the adhesiveness of the bonding portion can be easily adjusted, and the decorative member is satisfactorily bonded to the dial base.

In the dial of the present invention, the irreversible phase transition agent is preferably either a UV-curing type of curing agent, which is cured by irradiation with ultraviolet rays (UV), or a heat-curing type of setting agent, which is cured by heating.

In the dial with this structure, the bonding portion can be set in a desired period of time by various predetermined processing. For example, if these predetermined processings are used in a state in which the decorative member is bonded to the dial base, the bonding portion can be set while maintaining satisfactory bonding strength between the decorative member and the dial base. Therefore, foreign matter can be easily and reliably prevented from adhering to the peripheral portion of the decorative member. As used herein, predetermined processing refers to irradiation with a specific amount of ultraviolet rays when an irreversible phase transition agent of the UV curing type is used. The predetermined processing refers to heating at a specific temperature when an irreversible phase transition agent of the heat-curing type is used. Such processing makes it possible to easily set the bonding portion.

The method of manufacturing dials as described above is characterized in preparing a sheet-like adhesive label having a decorative member with a bonding portion, a release sheet attached to the side of the decorative member that has the bonding portion, and a transfer sheet attached to the side of the decorative member opposite from the side provided with the release sheet, the bonding portion including an adhesive for bonding the decorative member to the dial base and an irreversible phase transition agent capable of irreversibly phase-transforming the bonding portion to a solid state by setting or curing; peeling off the release sheet of the sheet-like adhesive label; attaching the surface of the bonding portion that is exposed by the peeling of the release sheet to the dial base with the adhesive; peeling off the transfer sheet from the decorative member attached to the dial base; and phase-transforming the bonding portion between the dial base and the decorative member to a solid state by the irreversible phase transition agent.

In this method of manufacturing dials, the decorative component formed on the sheet-like adhesive label is transferred to the dial base due to the adhering force of the bonding portion. The bonding portion is then irreversibly phase-transformed from a fluid state to a solid state, so the decorative member is affixed to the dial base while maintaining satisfactory bonding strength. Since the bonding portion is phase-transformed to a solid state, the decorative member maintains a satisfactory appearance without fine particles of foreign matter adhering to the peripheral portion thereof. Thus, unlike in conventional practice, operations for cleaning the foreign matter off with a solvent or the like are unnecessary, and the manufacturing steps are simplified.

Alternatively, the method of manufacturing the dial as described above is characterized in preparing a sheet-like adhesive label having a decorative member with a bonding portion, a release sheet attached to the side of the decorative member that has the bonding portion, and a transfer sheet attached to the side of the decorative member opposite from the side provided with the release sheet, the bond portion including an adhesive for bonding the decorative member to the dial base and an irreversible phase transition agent capable of irreversibly phase-transforming the bonding portion to a solid state by setting or curing; peeling off the release sheet of the sheet-like adhesive label; attaching the surface of the bonding portion exposed by the peeling of the release sheet to the dial base with the adhesive; phase-transforming the bonding portion between the dial base and the release sheet to a solid state by the irreversible phase transition agent; and peeling off the transfer sheet from the decorative member.

A method of manufacturing dials by using a sheet-like adhesive label having a bonding portion at least on the bonding surface of the decorative component, with a release sheet attached to the side on which the bonding portion is provided to the decorative component, and a transfer sheet attached on the side of the decorative component opposite from the side provided with the release sheet, is characterized in that the bonding portion of the sheet-like adhesive label is prepared in advance by including a fluid adhesive and an irreversible phase transition agent for irreversibly phase-transforming the bonding portion from a fluid state to a solid state by setting or curing; the release sheet of the sheet-like adhesive label is peeled off; the surface of the bonding portion that is exposed by peeling of the release sheet is attached to the dial base by the adhesion means; the bonding portion between the dial base and the decorative member is irreversibly phase-transformed from a fluid state to a solid state; and then the transfer sheet is peeled off from the decorative member.

In this method for manufacturing the dial, the decorative component formed on the sheet-like adhesive label is transferred to the dial base due to the adhering force of the bonding portion. The bonding portion is then irreversibly phase-transformed from a fluid state to a solid state before the transfer sheet is peeled off. In other words, the bonding portion is phase-transformed to a solid state while the decorative member is protected by the transfer sheet. Therefore, the adherence of foreign particles is even more reliably prevented.

There may also be cases in which, for example, the bonding portion is provided not only to the bonding surface of the decorative member, but also to the part of the transfer sheet devoid of the decorative member in a continuous configuration. Particularly in this case, the transfer sheet is peeled off after the bonding portion is phase-transformed to a solid state, so that the part of the bonding portion devoid of the decorative member does not adhere to the dial base, and no excessive parts of the bonding portion remain on the dial base. Therefore, a satisfactory appearance is maintained.

Another feature of conventional practice is that the bonding portion in the peripheral area of the attachment member sometimes does not separate easily when the transfer sheet is peeled off, and is allowed to remain on the peripheral portion of the attachment member. In the method of manufacturing a dial of the present invention, the bonding portion has already undergone a phase transition to a solid state when the transfer sheet is peeled off. Therefore, the bonding portion is easily separated in the peripheral portion of the attachment member without being elongated, and the bonding portion does not protrude in the peripheral portion of the decorative member. This results in a satisfactory appearance. Particularly when a UV curing type is used as the irreversible phase transition means, semi-curing is performed because it is difficult to expose the bonding portion between the decorative member and the dial base to ultraviolet rays (UV). By contrast, the bonding portion in other areas where the decorative members are not disposed is completely cured. Therefore, the bonding portion in the peripheral portion of the decorative member is satisfactorily separated when the transfer sheet is peeled off.

The timepiece relating to the present invention includes a frame, a movement part fitted in the frame, a minute hand and an hour hand functionally engaged by the movement part, and a dial disposed between the movement part and the minute and hour hands, wherein the dial has a dial base and a decorative member bonded to the dial base via a bonding portion; wherein the bonding portion contains an adhesive for bonding the decorative component to the dial base, and an irreversible phase transition agent capable of irreversibly phase-transforming the bonding portion to a solid state by setting or curing; and wherein at least the peripheral portion of the bonding portion is solidified by the irreversible phase transition agent.

Such a dial has no adherence of foreign particles as previously described, has a satisfactory appearance, and is therefore suitable for use as the dial of a timepiece.

The objectives, characteristic, merits, and other features of the present invention as described above will be clear to those skilled in the art from the following description of the invention. The description of the invention hereinbelow discloses the preferred embodiments of the present invention together with the accompanying drawings.

BRIEF DESCRIPTION OF THE DRAWINGS

The drawings that follow constitute a part of the disclosure of the present invention.

BEST MODE FOR CARRYING OUT THE INVENTION

The embodiments of the present invention are described below with reference to the diagrams. As will be made clear to those skilled in the art by the disclosure of this invention, the descriptions relating to the embodiments of the present invention are intended only to describe the present invention, and do not limit the scope of the present invention as defined by the claims to be later described or equivalent thereto.

The present embodiment describes, with reference to the diagrams, the manner in which the sheet-like adhesive label of the present invention is applied to the decorative member of the dial in a timepiece.

Sheet-Like Adhesive Label

Figure 1:
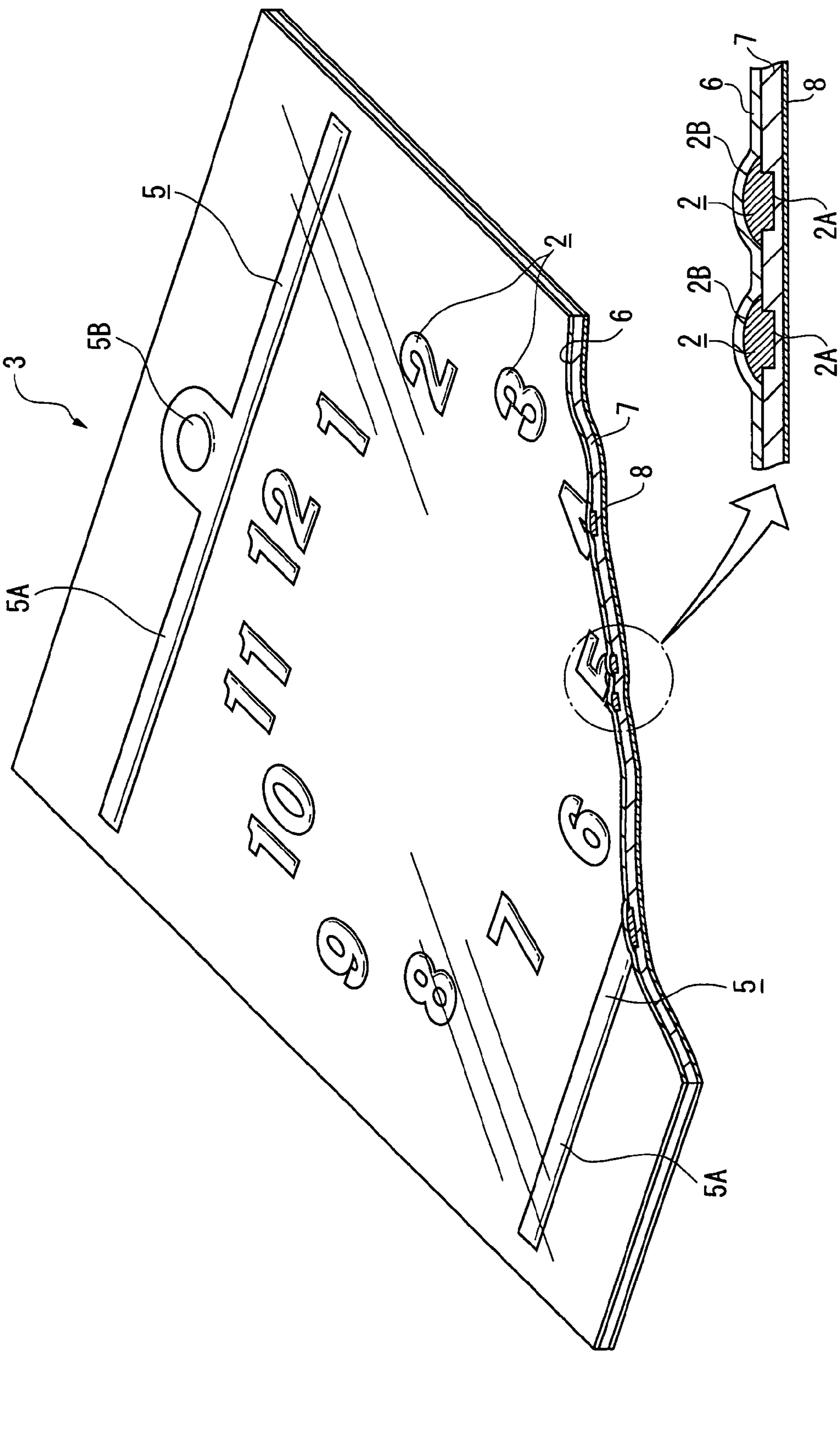
FIG. 1 is a partial cross-sectional view showing an entire dial label in accordance with an embodiment of the present invention.

FIG. 1 shows a partial cross-sectional view of a dial label (sheet-like adhesive label) 3 used in the manufacture of a dial 1 (see FIG. 6) for a timepiece. In the dial label 3, dial members (attachment members, decorative members) 2 on a dial base (adherend) 4 (see FIG. 6) are fashioned into sheets.

In FIG. 1, the dial members 2 are formed into the shape of letters and numbers (numbers in the present embodiment), and a plurality of dial members 2 is arranged in a bonded state on the dial base 4. In the dial members 2, the surfaces bonded to the dial base 4 are formed into planar bonding surfaces 2A. The side opposite from the bonding surfaces 2A has convex portions 2B that have arcuate cross sections and can be seen from the outside when bonded to the dial base 4. Further, the convex portions 2B have bonding surfaces that directly contact the bonding portion 7. Moreover, the bonding surfaces 2A extend from the convex portions 2B toward the bonding portion.

The dial members 2 are formed by electroforming/plating and are made, for example, from nickel (Ni), copper (Cu), gold (Au), silver (Ag), or other such material with minimal plating stress after forming. The method of electroforming/plating is a well-known technology among those skilled in the art and is therefore not described in detail herein.

A transparent film-shaped transfer sheet 6 is affixed to the convex portions 2B of the dial members 2 so as to conform to the shape of the convex portions 2B. This transfer sheet 6 is coated with an adhesive (not shown) on a surface of the side affixed to the dial members 2, and is bonded to the dial members 2 with an appropriate degree of bonding strength. The transfer sheet 6 prevents mutual displacement of the dial members 2 when the dial members 2 are transferred to the dial base 4, and also serves as a protective sheet for the dial members 2 to protect the dial members 2 from damage.

The material of the transfer sheet 6 should be a readily adhering nonporous material that can be easily peeled off the dial members 2. For example, polyethylene, polypropylene, or another such soft film or the like can be used.

The bonding surfaces 2A of the dial members 2 and the part of the transfer sheet 6 on which the dial members 2 are not disposed are coated with a bonding agent (one example of the bonding portion) 7 so that they can be bonded to the dial base 4. The bonding agent 7 includes a fluid adhesive (one example of the adhesive means) and a curing agent (one example of the irreversible phase transition means and the irreversible phase transition agent) for irreversibly transforming the phase of the bonding agent 7 from a fluid state to a solid state by setting or curing. As used herein, "setting"

refers to the solidification of the bonding portion by removing the water or solvent. Also, "curing" refers to the solidification of a bonding portion by a polymerization reaction, which includes, for example, photocuring involving solidification by irradiation with ultraviolet rays (UV) or the like, or heat-curing involving setting by heating or irradiation with heat rays, or the like.

Examples of suitable adhesives include solvent-based self-bonding type adhesives, which adjust the adhesiveness by volatizing the solvent a water-soluble self-bonding type adhesives, which adjust the adhesiveness by evaporating the water, and a UV self-bonding type adhesives, which adjust the adhesiveness by irradiation with ultraviolet rays (UV). A urethane resin or the like, for example, can be used as the solvent-based self-bonding type, and an acrylic resin or the like can be used as the water-soluble self-bonding type end the UV self-bonding type. The method for adjusting adhesiyeness by UV irradiation is a well-known technology among those skilled in the art and is therefore not described in detail herein.

Examples of suitable curing agents include a heat-cured type cured by heating, a UV-curing type cured by irradiation of ultraviolet rays, and the like. An epoxy resin or the like, for example, can be used as the heat-cured type, and an acrylic resin or the like can be used as the UV-curing type. The method for curing a bonding agent by UV irradiation is a well-known technology among those skilled in the art and is therefore not described in detail herein.

The selection of the materials for the adhesive and the curing agent, and the compounding ratio thereof are appropriately determined with consideration to the compatibility of both materials, the necessary bonding strength, and the like. In other words, when, for example, the solvent-based self-bonding type and the UV-curing type are combined, the urethane resin and the acrylic resin are mixed in a suitable compounding ratio. The bonding strength achieved when the UV-curing type has been cured can be increased or decreased by varying this compounding ratio. Therefore, the compounding ratio and the materials can be appropriately selected according to their intended use, such as when the goal is to obtain a strong bonding strength in order to improve durability, or when the goal is to set the bonding strength to a comparatively small value in order to make it easier to introduce a new product model.

A release sheet 8 tightly affixed to the bonding agent 7 is provided to the bonding surfaces 2A of the dial members 2. The material of the release sheet 8 may be composed of material that is air impermeable and has satisfactory releasability from the bonding agent 7. Such material includes, for example, a paper whose surface has been treated with a fluororesin, or a resin-made film. This release sheet 8 prevents adherence of foreign particles to the bonding agent 7, volatilization of the solvent of the bonding agent 7, and evaporation of the water.

Method of Manufacturing and Attaching Sheet-like Adhesive Label

Figure 4:
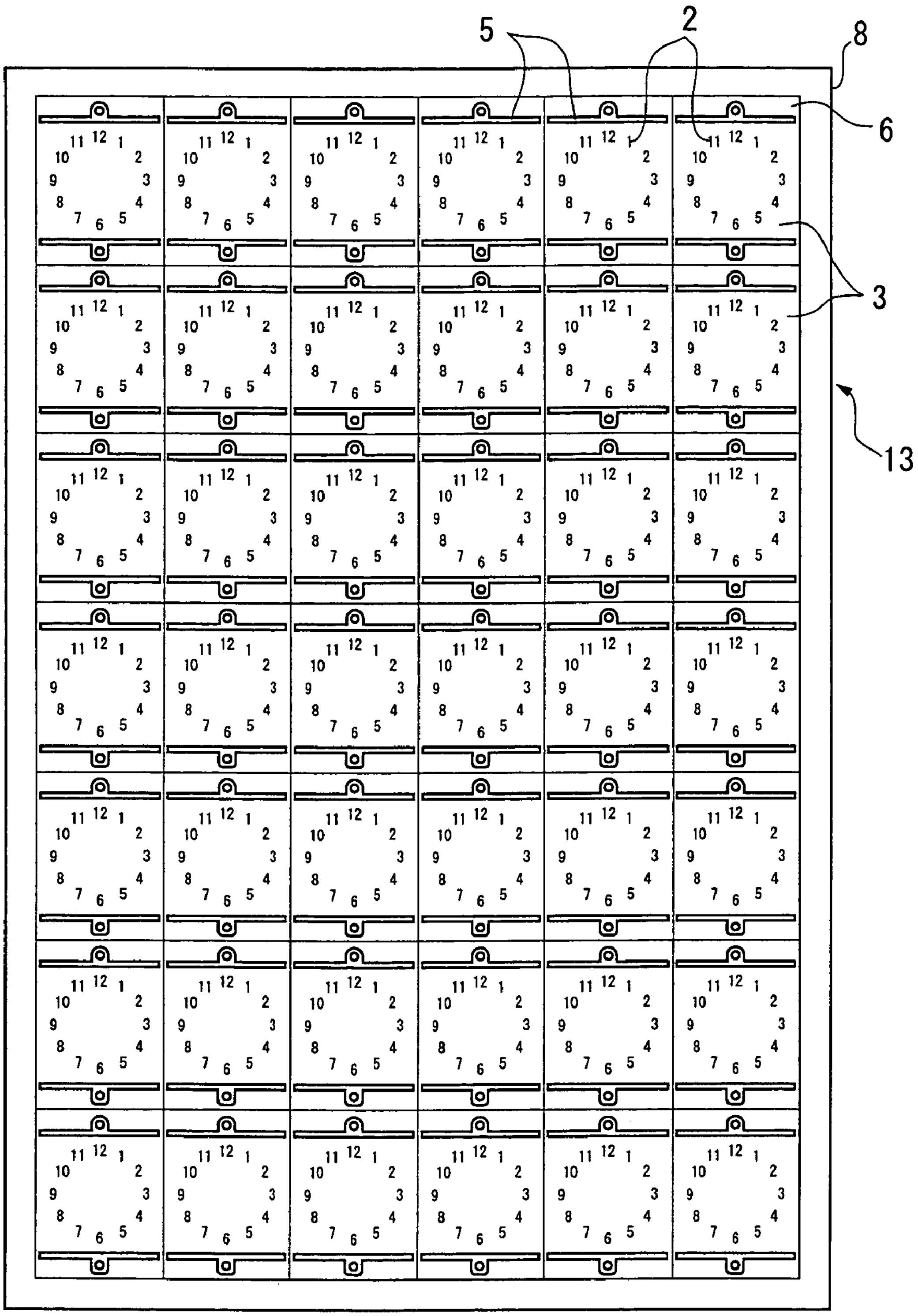
FIG. 4 is a plan view showing a dial label in accordance with an embodiment of the present invention.

As shown in FIG. 4, such dial labels 3 are manufactured, for example, by vertically and horizontally aligning a plurality of dial labels 3 to form a dial label 13 and cutting the dial label 13. The method for manufacturing the dial labels 3 relating to the present invention is described below.

The dial labels 3 are manufactured by forming the electroformed/plated dial members 2 on the sheet-like adhesive label. First, the method for manufacturing the dial members 2 will be described.

Figure 2:
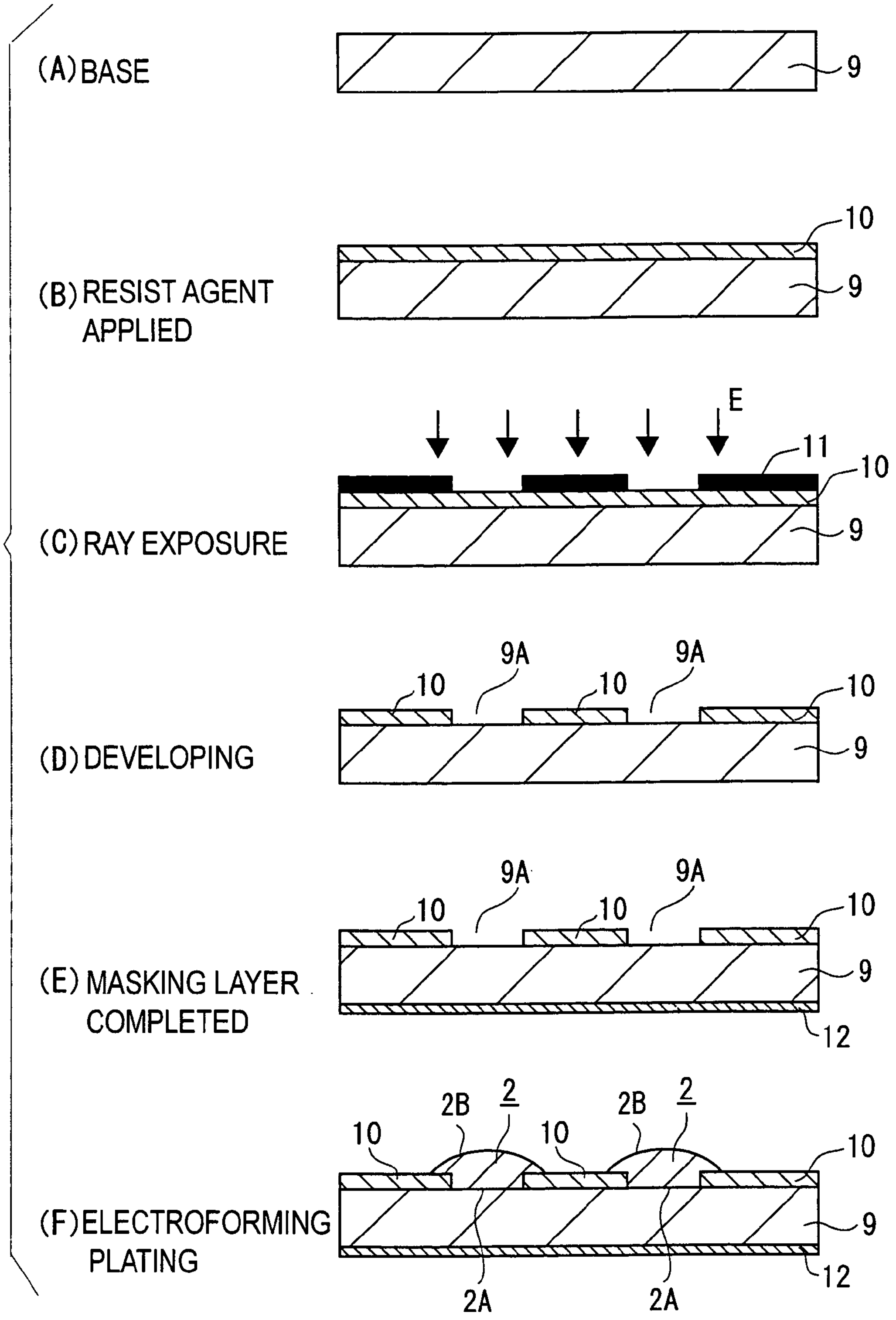
FIG. 2 is a diagram showing the method for manufacturing a dial member in accordance with an embodiment of the present invention.

FIG. 2 shows the steps for manufacturing the dial members 2 by electroforming/plating. To manufacture the dial members 2, first, as shown in FIGS. 2(A) and (B), one surface of a plate-shaped base 9 is coated with a resist agent 10.

The base 9 preferably has a mirror surface provided with a smooth surface finish to ensure a uniform plating thickness. When the surface of the base 9 is not smooth, copper should be deposited by plating as an underlayer to smooth out the surface. The material of the base 9 should be electrically conductive. For example, nickel silver (NS), copper (Cu), steel products, or the like can be used. Alternatively, a conductive film may be formed on the surface of the nonconductive material. Formation of conductive films is a well-known technology and is therefore not described in detail herein. The size of the base 9 should be enough to accommodate the plurality of dial labels 3 disposed in a vertical and horizontal arrangement. The thickness of the base 9 should ensure satisfactory strength for operations and handling, and is appropriately determined with consideration to the material, size, and other attributes of the base 9.

A nonconductive and preferably photo-developed type material can be used as the resist agent 10, which is formed on the surface of the base 9 by printing, coating, film attachment, or other such methods. An acid-resistant nonconductive layer is formed on one surface of the base 9 by the resist agent 10. The thickness of the resist agent 10 is appropriately determined with consideration to the thickness, size, and other attributes of the dial members 2. Generally, adequate three-dimensional dial members 2 can be obtained by keeping the thickness at 10 μm or greater. When thick plating is desired, the thickness of the resist agent 10 must be increased to ensure dimensional accuracy in the dial members 2. In this case, the desired thickness should be determined by superposing the film-shaped resist agent.

As shown next in FIG. 2(C), a negative 11 is created in the shape of the dial members 2. The negative 11 is then coated on the surface to which the resist agent 10 has been applied, and ultraviolet ray exposure E is performed. The negative 11 is fashioned to dimensions that, as correction values, incorporate dimensional errors produced by the various procedures, such that the dial members 2 have the desired dimensions after the electroforming/plating is carried out.

The base 9 subjected to ultraviolet ray exposure E is then developed by methods such as a commonly practiced alkali developing, a solvent formula, or other such methods, as shown in FIG. 2(D). The resist agent 10 is then removed along the shape of the negative 11. Thus, a plated portion 9A on which the conductive base 9 is exposed is formed in substantially the same shape as the dial members 2.

As shown in FIG. 2(E), a masking layer 12 is then formed on the surface of the side opposite from the plated portion 9A of the base 9 (rear surface). The masking layer 12 is formed to prevent a plated layer from being formed on the rear surface of the conductive base 9 when electroforming/plating is performed. The masking layer 12 is composed of nonconductive material, and is formed by methods such as, for example, applying a synthetic resin or other such paint by coating or screen printing, attaching a synthetic resinous film, or other such methods.

Such a base 9 undergoes electroforming/plating as shown in FIG. 2(F). It is necessary to ensure the conductivity of the base 9 and to make it easy to peel off the dial members 2 formed by electroforming/plating from the base 9. Activation treatment or passivation treatment is then applied to the base 9 prior to electroforming/plating. Activation treatment and passivation treatment are well-known technologies and are therefore not described in detail herein.

An electroformed/plated layer is then formed on the base 9 in an electroforming/plating bath. The electroforming/plating is performed in commonly practiced electroplating conditions. The material of the plating solution is the material used in the dial members 2 or the like, as previously described. The thickness of the electroformed/plated layer is adequately set so that the desired appearance of solidity is obtained. As a result of this electroforming/plating, the plated portion 9A on the base 9 is filled with the plating solution, and the convex portions 2B are formed in an overlaying shape partially overflowing from the plated portion 9A. Electroforming/plating is a well-known technology among those skilled in the art, and further detailed explanations are therefore omitted herein.

After the electroforming/plating, various aftertreatments may be applied to the dial members 2 formed in the desired thickness to bring about variations in color tone and finish. Examples of such aftertreatments include Au plating, Rh plating, black Ni plating, Sn plating, black Cr plating, matted Ni plating, and the like. Alternatively, a color may be added by spray painting, electrodeposition painting, or the like. These aftertreatments are well-known technologies among those skilled in the art and are therefore not described in detail herein.

Next, the method for forming the dial members 2 formed by the methods described above on the dial label 13 will be described.

Figure 3:
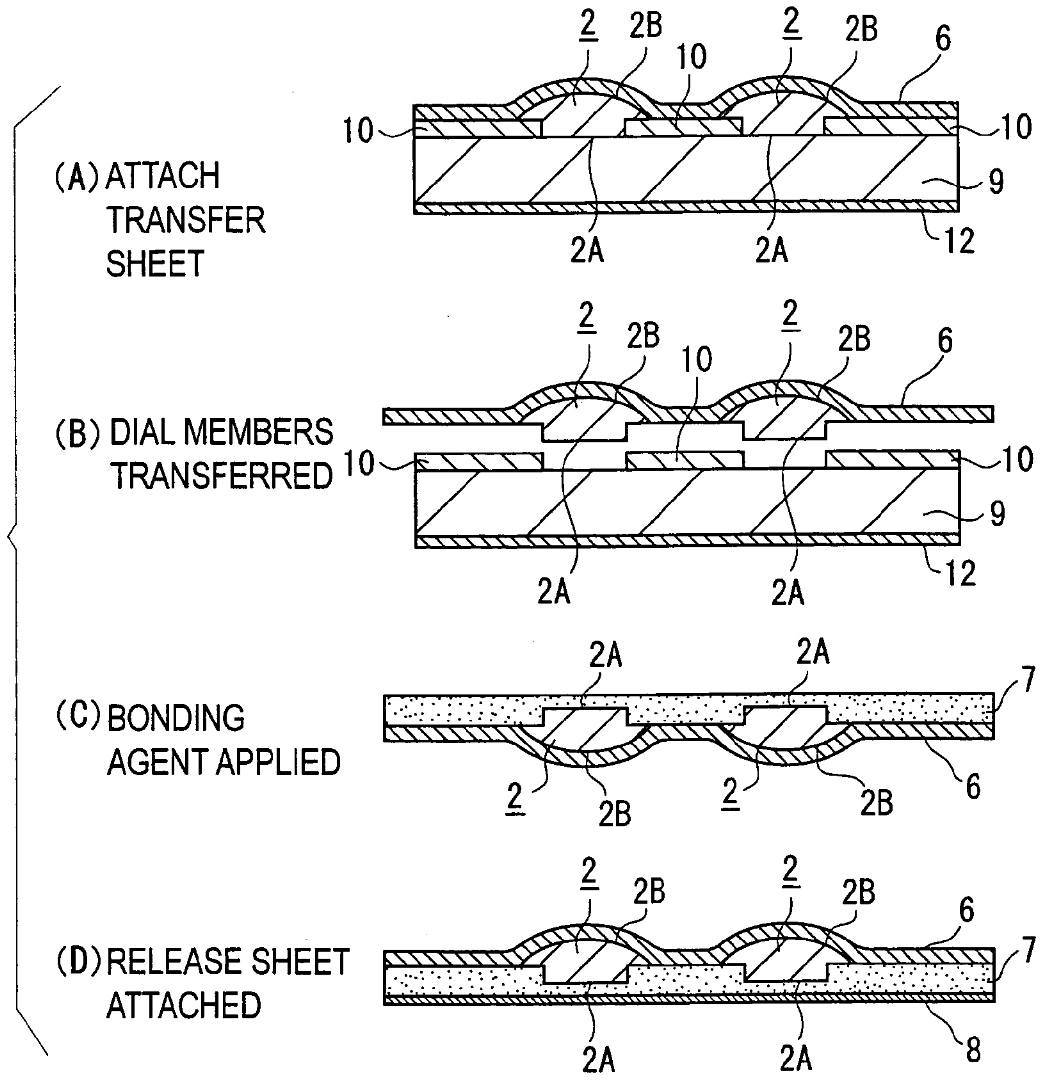
FIG. 3 is a diagram showing the method for manufacturing a dial label in accordance with an embodiment of the present invention.

FIG. 3 shows the steps for manufacturing the dial label 13. As shown in FIG. 3(A), a transfer sheet 6 is affixed to the base 9, which contains the convex portions 2B of the dial members 2 formed by electroforming/plating. In this state, as shown in FIG. 3(B), the transfer sheet 6 is peeled off from the base 9. Since a bonding agent is applied to the transfer sheet 6 as previously described, the convex portions 2B adhere to the transfer sheet 6. The base 9 is treated so that the dial members 2 can be easily peeled off. The bonding force between the base 9 and the dial members 2 is set to be weaker than the bonding force between the dial members 2 and the transfer sheet 6. Such treatments are well-known technologies among those skilled in the art and are therefore not described in detail herein. Therefore, the dial members 2 are transferred from the base 9 to the transfer sheet 6 as the transfer sheet 6 is peeled off.

Next, as shown in FIG. 3(C), the bonding agent 7 is applied to the bonding surfaces 2A of the dial members 2 by spraying, screen printing, or other such methods. The thickness of the bonding agent 7 is appropriately set with consideration to the shape, dimensions, surface roughness, and the like of the dial members 2 and the dial base 4; for example, at 20 μm or greater or the like. When screen printing methods are used, the coating thickness can be set according to the viscosity of the bonding agent 7 and the mesh coarseness of the screen, such that a uniform thickness with a smooth surface is obtained. The bonding agent 7 is also coated to the sections of the transfer sheet 6 devoid of the dial members 2 in order to coat the entire transfer sheet 6.

In this operation, a liquid bonding agent 7 that has fluidity is coated due to considerations to simplicity of operations. Its adhesiveness is subsequently adjusted by applying a predetermined treatment to the bonding agent 7. This predetermined treatment may, for example, entail volatizing the solvent or evaporating the water by letting the adhesive stand to adjust adhesiveness after the bonding agent 7 is applied to the transfer sheet 6, if a bonding agent 7 containing a solvent-based self-bonding type or water-soluble self-bonding type adhesive is employed. Volatilization of the solvent or evaporation of the water may also be facilitated by heating the bonding agent 7. In this case, a specific temperature should be set with consideration to the heat resistant temperature of the transfer sheet 6. For example, the heating should be done at 100° C. or less.

After the bonding agent 7 is made adhesive, the release sheet 8 is attached to the coated surface of the bonding agent 7, as shown in FIG. 3(D).

The methods described above are used to form dial members 2 on a dial label 13 that has the bonding agent 7 on the bonding surfaces 2A and is covered with the transfer sheet 6 and release sheet 8 on both surfaces. In the dial label 13, as shown in FIG. 4, a plurality of dial labels 3 is continuously disposed vertically and horizontally. Therefore, when the dial labels 3 are used, the dial label 13 should be cut as necessary in accordance with the supply configuration of the dial label 13. The dial label 13 may, for example, be used manually or with a cutting machine.

Dial

Figure 5:
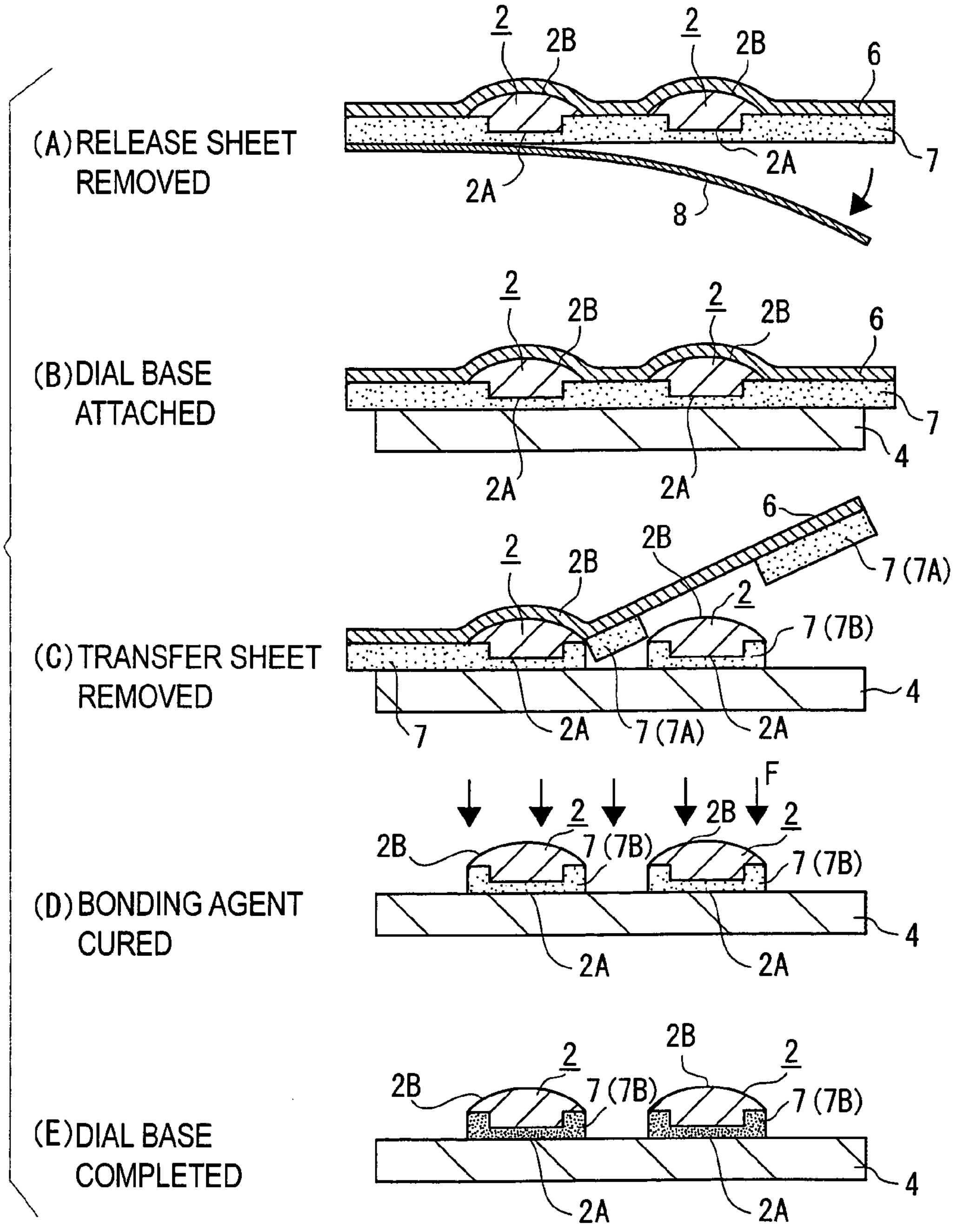
FIG. 5 is a diagram showing the method of manufacturing dials in accordance with an embodiment of the present invention.
Figure 6:
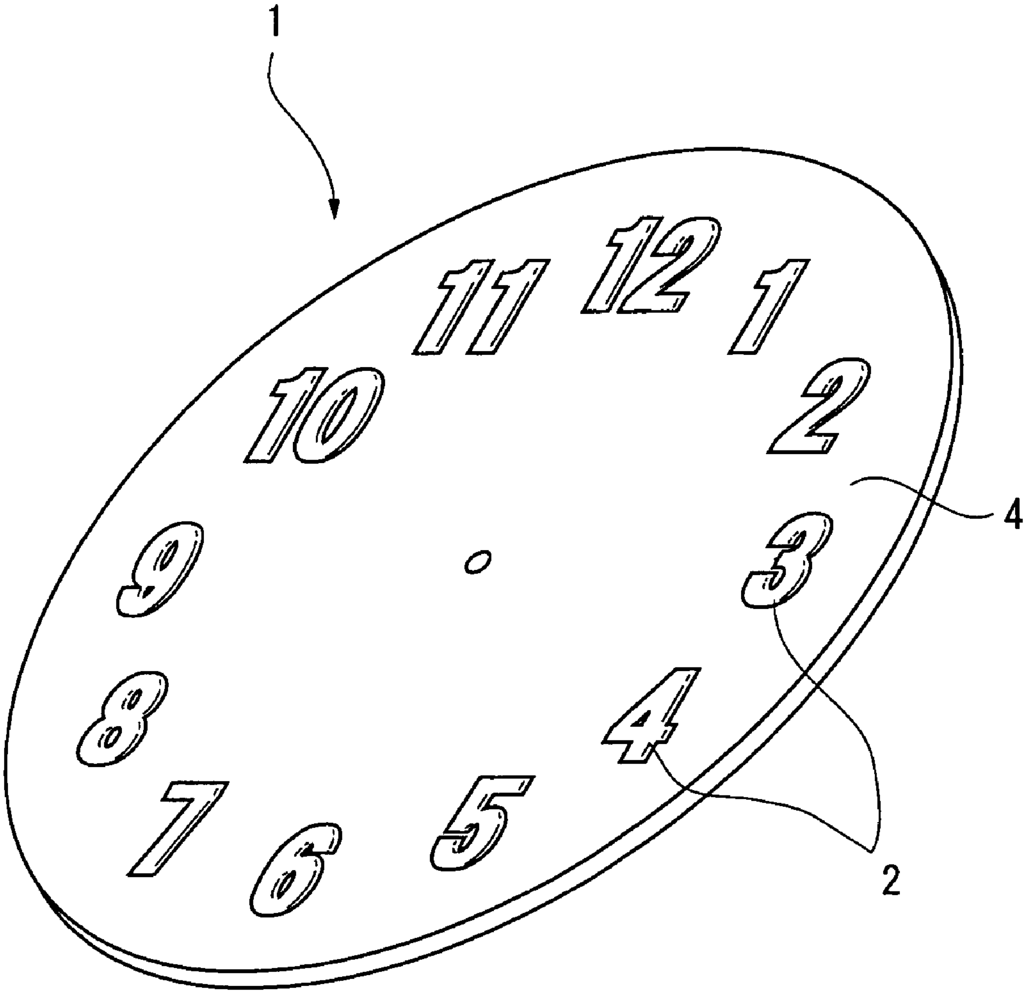
FIG. 6 is a perspective view showing a dial in accordance with an embodiment of the present invention.

As shown in FIGS. 5 and 6, the dial 1 relating to the present invention, which is obtained by attaching to the dial base 4 a dial label 3 formed as described above, includes a dial formation portion 4', a dial underside bonding layer 7B, and the dial members 2 attached to the dial formation portion 4' by the dial underside bonding layer 7B. Since the dial underside bonding layer 7B is set or cured when the dial label 3 is attached, at least the peripheral surface of the dial underside bonding layer 7B is in a solidified state.

Method for Manufacturing Dials

The method for manufacturing the dial 1 by attaching a dial label 3 to the dial base 4 relating to the present invention will be described.

First, the soil on the dial base 4 is removed in advance by cleaning or the like to improve adhesion with the dial members 2. The dial base 4 is a flat-plate shaped member having four corners (not shown), which includes a dial formation portion 4' formed in the middle and a gripping portion formed in the periphery of the dial formation portion 4'. The circular dial base 4 as shown in FIG. 6 is obtained by removing the gripping portion from the dial base member. Grooves or the like are formed in between the dial base member and the gripping portion, making it easy for them to be cut. The gripping portion is provided with positioning holes to position the dial base 4 while the dial members 2 are attached.

Such a dial base 4 is fixed in an attachment fixture to position the dial base 4 in relation to the dial members 2. The attachment fixture is provided with pins for positioning the dial base 4. Such positioning is performed by aligning the pins with the positioning holes of the dial members 2. When the dial base 4 is structured with only the dial formation portion 4' and is devoid of the gripping portion, notches or the like should be provided to the dial formation portion 4', that is, to the periphery of the dial base 4, to enable positioning.

The release sheet 8 of the one of the dial labels 3 cut out from the dial label 13 is peeled off as shown in FIG. 5(A). Since the bonding strength between the release sheet 8 and the bonding agent 7 is set to be weaker than the bonding strength between the bonding agent 7 and the transfer sheet 6, the dial members 2 and the bonding agent 7 remain on the transfer sheet 6 when the release sheet 8 is peeled off.

Establishing such bonding strengths is a well-known technology among those skilled in the art and is therefore not described in detail herein.

Next, the surface of the bonding agent 7 that is exposed after the release sheet 8 is peeled off is attached to the dial base 4, as shown in FIG. 5(B). As shown in FIG. 1, both peripheral edges of the area on which the dial members 2 are disposed are provided with a positioning portion 5, which defines the attachment position in relation to the dial base 4. The positioning portions 5 have cylindrical portions 5A disposed parallel to each other, and positioning holes 5B formed in the middle of the lengthwise direction of the cylindrical portions 5A. Therefore, the position of the dial members 2 in relation to the dial base 4 is determined by aligning the positioning holes 5B of the positioning portions 5 with the other pins provided to the attachment fixture. After the dial members 2 are disposed in a predetermined position on the dial base 4, pressure is applied to the dial members 2 from above the transfer sheet 6 to reliably adhere the dial members 2 to the dial base 4.

Next, as shown in FIG. 5(C), the transfer sheet 6 is peeled off. At this time, the dial members 2 are pressed and bonded to the dial base 4. As the transfer sheet 6 is peeled off while pressure is applied to the dial members 2, the dial members 2 remain bonded to the dial base 4. A peripheral bonding layer 7A, which is the part of the bonding agent 7 devoid of the dial members 2, is bonded to and peeled off together with the transfer sheet 6, and is separated from the dial underside bonding layer 7B, which is the part of the bonding agent 7 between the dial members 2 and the dial base 4. Therefore, the bonding strength between the transfer sheet 6 and the bonding agent 7 is preferably set to a value greater than the bonding strength between the bonding agent 7 and the dial base 4. The bonding strength between the bonding agent 7 and the dial base 4 is preferably set to a value greater than the bonding strength between the dial members 2 and the transfer sheet 6. Under such conditions, the peripheral portion 7A is satisfactorily peeled off together with the transfer sheet 6. Even when such conditions are difficult to fulfill, the dial members 2 can still be left on the dial base 4, and the peripheral portion 7A can be peeled off together with the transfer sheet 6 by peeling off the transfer sheet 6 while pressing on the dial members 2.

In this state, as shown in FIG. 5(D), the phase of the bonding agent 7 is irreversibly changed from a fluid state to a solid state; that is, the bonding agent is solidified. The setting method differs depending on the curing agent used. For example, when a heat-curing type of curing agent is used, the dial base 4 to which the dial members 2 are bonded is heated. The temperature of heating F is set with consideration to the material of the curing agent, the materials of the dial members 2 and dial base 4, and the like. For example, heating may be done at 120° C. or greater. Irradiation of infrared rays, far-infrared rays, or the like may also be used together with heating F. For example, when a UV-curing type of curing agent is used, a specific quantity of ultraviolet rays F is irradiated on the bonding agent 7. The quantity of ultraviolet rays F differs depending on the material of the UV-curing type of curing agent. Normally, the quantity is set to be 800 mj/cm$^2$ or greater.

When a UV self-bonding type is used as the adhesive and a UV-curing type is used as the curing agent, the adhesiveness is adjusted by controlling the intensity of UV illumination, after which photocuring is performed. In this case, normally the UV-curing type requires a greater intensity of illumination than the UV-bonding type, and photocuring may be performed with an intensity of illumination of 150 mW/cm$^2$ or greater, for example.

When a UV-curing type of curing agent is used, the bonding agent on the peripheral portions of the dial members 2 is cured when UV is irradiated. At this point, depending on the shape of the dial members 2, the internal curing agent may be covered by the dial members 2 and remain uncured. In such a case, the internal periphery of the dial underside bonding layer 7B is satisfactorily adhered due to the adhering force of the adhesive, and the external periphery of the dial underside bonding layer 7B is reliably cured.

The dial formation portion 4' of the dial base 4, to which the dial members 2 is attached by such methods, is cut along grooves or the like formed between the gripping portion and the dial formation portion 4', whereby a dial 1 such as is shown in FIG. 6 is formed. When a dial base 4 with no gripping portions is used, such cutting steps are unnecessary.

Timepiece

Figure 8:
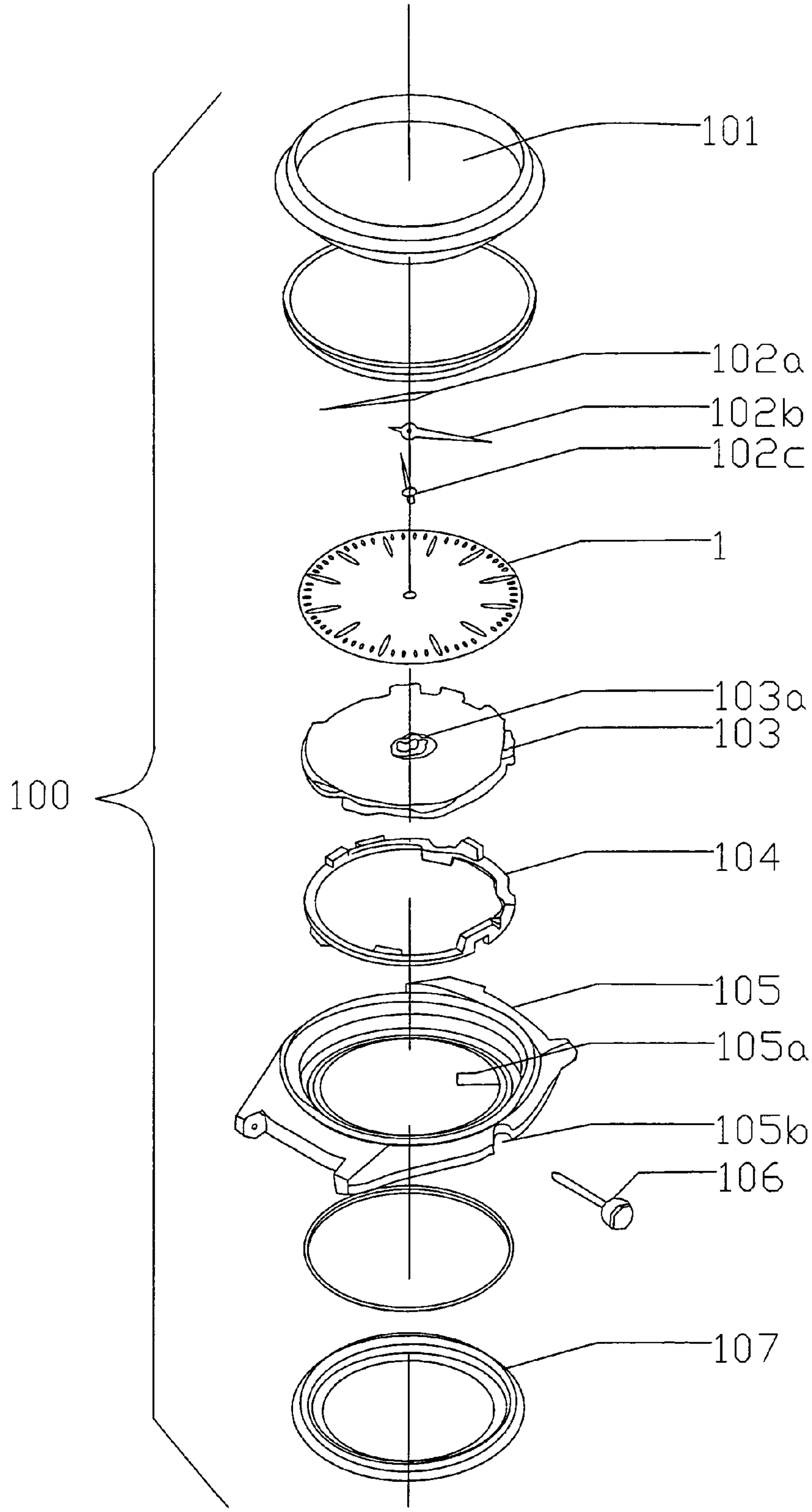
FIG. 8 is an exploded perspective view of a timepiece in accordance with an embodiment of the present invention.

A timepiece 100 having the dial 1 relating to the present invention is shown in FIG. 8. The timepiece 100 is primarily structured from a cover glass 101, a second hand 102*a*, a minute hand 102*b*, an hour hand 102*c*, the dial 1 relating to the above-mentioned present invention, a movement portion 103, a central rim 104, a frame 105, a winder 106, and a back cover 107.

The movement portion 103 interlocks with a hole 105*a* of the frame 105, with the central rim 104 inserted therebetween, so as not to be able rotate relative to the frame 105. The movement portion 103 has a mounting axis 103*a*. The second hand 102*a*, minute hand 102*b*, and hour hand 102*c* nonrotatably interlock with the mounting axis 103*a* from the top of the dial 1. The movement portion 103 transmits the rotational movement to each of the second hand 102*a*, minute hand 102*b*, and hour hand 102*c* by rotating the movement portion 103 with a battery (not shown). The cover glass 101 interlocks with the top of the hole 105*a*.

The frame 105 also has a small hole 105*b* on the side, and the winder 106 passes through the small hole 105*b*. The winder 106 has a knob 106*a* at one end and a pointed end 106*b* at the other end. The pointed end 106*b* interlocks with the movement portion 103. Thus, the rotations of the second hand 102*a*, minute hand 102*b*, and hour hand 102*c* can be adjusted by rotating the winder 106. The back cover 107 interlocks with the underside of the hole 105*a* of the main body.

FIG. 8 discloses a wristwatch as an example of a timepiece having the dial in accordance with the present invention, but the applicable scope of the present invention is not limited to such type of timepiece. In addition, the present invention can also be applied to a standing clock, a handheld watch, a wall clock, and the like.

According to the embodiments described above, the following merits are obtained.

Since an adhesive and a curing agent are provided to the bonding agent 7, the adhesiveness and curability can be obtained in a desired amount of time. In other words, since the adhesiveness is adjusted when the dial members 2 are attached to the dial base 4, they can be satisfactorily bonded. Also, fine particles of foreign matter do not adhere to the peripheral portions of the dial members 2 because the bonding agent 7 is cured by a curing agent after the dial members 2 are attached. Fine particles of foreign matter can easily be removed by blowing air, even when they do attach to the peripheral portions of the dial members 2. Therefore, a satisfactory appearance can be maintained. Even when a UV-curing type is used as the curing agent, since reliable curing can be ensured due to UV irradiation, fine particles of foreign matter do not adhere to the peripheral portions of the dial underside 7B and a satisfactory appearance can be maintained. In this case, the interior of the dial underside 7B, which is not directly exposed to UV rays, is only semi-cured, but is still satisfactorily self-bonded by the adhesive.

In conventional dial members 2, the foreign particles adhered to the peripheral portions of the conventional dial members 2 were removed with a cotton swab or the like soaked in a solvent, but such operations are unnecessary according to the present embodiment, because the adhesion of fine particles of foreign matter is prevented. Therefore, the steps for manufacturing the dial 1 are simplified. Furthermore, since there is no misalignment of the dial members 2 or staining the dial base 4 due to removal operations with a solvent, defective products can be reduced and the yield can be improved.

Conventional adhesives remain fluid even after the product is completed, so the dial members 2 moves its position or comes off when external forces are applied. However, since the bonding agent 7 is cured according to the present embodiment, the dial members 2 can be reliably affixed to the dial base 4 and therefore can be used even on the exterior of the product.

Since a solvent-based self-bonding type adhesive, a water-soluble self-bonding type adhesive, or a UV self-bonding type adhesive is used as the adhesive of the bonding agent 7, the adhesiveness can be reliably adjusted in a desired amount of time by applying treatments such as those previously described.

Since a UV curing type agent, a heat curing type agent, or the like is used as the curing agent of the bonding agent 7, the bonding agent 7 can be reliably cured in a desired amount of time by applying treatments such as those previously described.

If such a dial 1 is applied to a timepiece, the adhesion of fine particles of foreign matter can be prevented and a satisfactory appearance can be maintained.

The dial members 2 can be prevented from scratching because the dial labels 3 are covered by the release sheet 8 and transfer sheet 6. The dial labels 3 can also be preserved for a long time because the bonding agent 7 is prevented from drying. Therefore, if the dial labels 3 can be stored away for some time, it will be easy to implement inventory control of the manufacturing steps in response to market trends.

Other Embodiments

The present invention is not limited to the previously described embodiment, and any modifications, improvements, and other changes made within the scope that allows the objects of the present invention to be attained are also included in the present invention.

(a) For example, in the previously described embodiment, all the dial members 2 disposed on the dial 1 were formed as a single dial label 3, but the present invention is not limited thereto. For example, a single dial member 2 may be formed as the dial label 3. Also, when dial members 2 having different colors or different materials are disposed on a single dial 1, a plurality of dial labels 3 may be formed depending on the color or material.

In addition, the dial members 2 were numbers, but they need not be limited thereto and may also be letters, markings, manufacturer's names, product name logos, warning labels, and other decorative designs or any desired configurations.

(b) Furthermore, the dial 1 is not limited to displaying the current time, and may also display the date, day of the week, and the like.

(c) When the dial members 2 were attached to the dial base 4, the bonding agent 7 was solidified after the transfer sheet 6 was peeled off from the dial base 4 in the present embodiment, but the bonding agent may also be solidified before the transfer sheet 6 is peeled off. The manner of attaching the dial members 2 to the dial base 4 according to this method is shown in FIG. 7.

Figure 7:
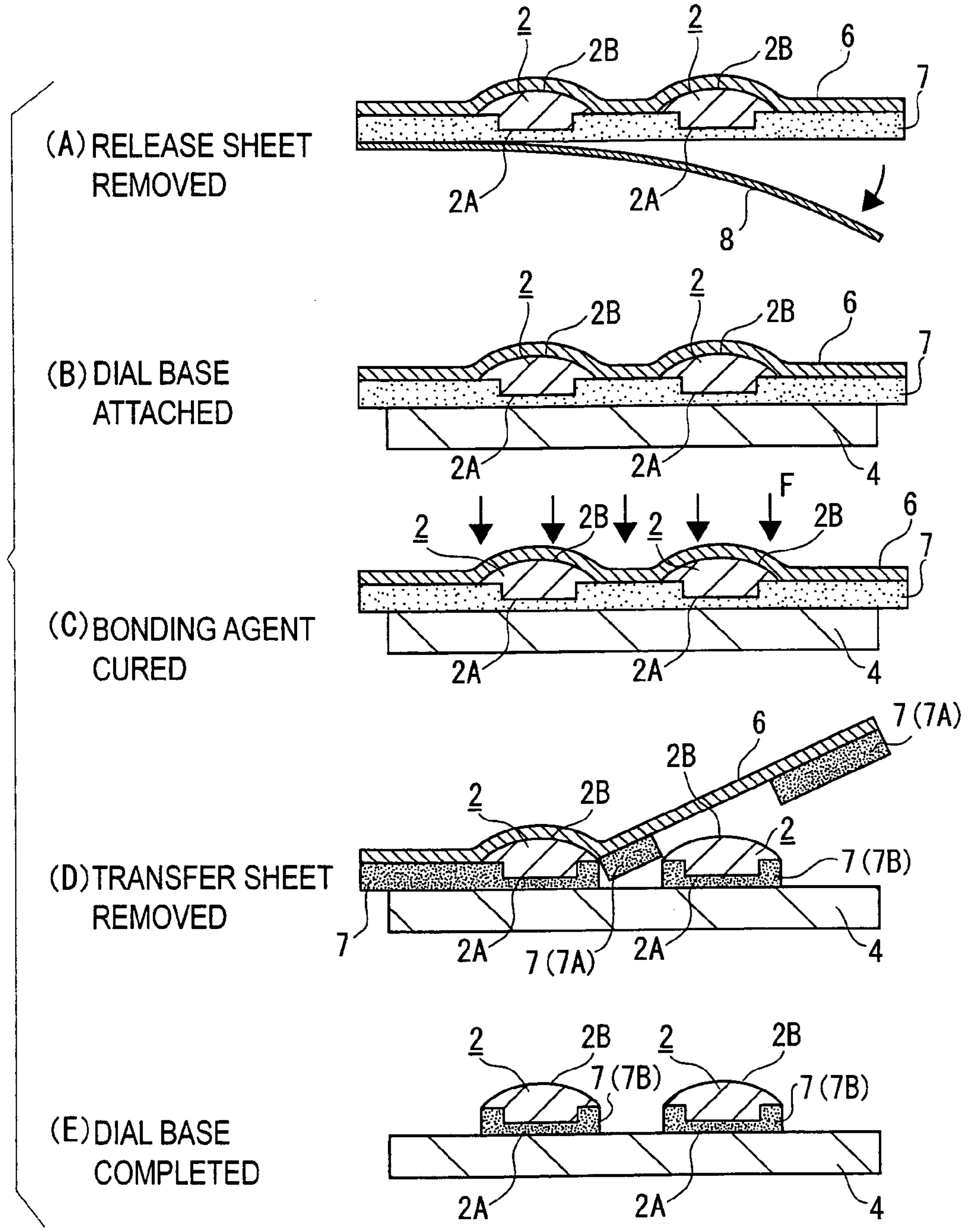
FIG. 7 is a diagram showing the method of manufacturing dials in accordance with another embodiment of the present invention.

After the dial members 2 in FIG. 7(A) and FIG. 7(B) are attached to the dial base 4 in the manner shown in FIG. 7, heating, a combination of heating and heat ray irradiation, or UV irradiation is performed according to the material of the curing agent, and the curing agent is cured, as shown in FIG. 7(C). When performing heat treatment, the heating temperature must be adjusted with consideration to the heat resistance of the transfer sheet 6, and heating should be done at 80° C. or higher, for example.

As shown in FIG. 7(D), the transfer sheet 6 is subsequently peeled off from the dial base 4. The peripheral portion 7A devoid of the dial members 2 is peeled off from the dial base 4 along with the transfer sheet 6.

In conventional practice, when the transfer sheet 6 is peeled off, sometimes the peripheral portion 7A remains on the dial base 4 and a satisfactory appearance cannot be obtained. In view of this, the dial base 4 is wiped with a brush coated with a cleaner, or a cotton swab soaked in a solvent or the like to remove the remaining bonding agent 7. However, since the bonding agent 7 is adhesive, the bonding agent 7 leaves behind streaks that tarnish the dial base 4, the dial members 2 become misaligned, scratches or spots form on the dial base 4, or other such undesirable phenomena occur.

According to the present invention, the bonding agent 7 is solidified by the curing agent when the transfer sheet 6 is peeled off, preventing the peripheral portion 7A from adhering to the dial base 4, and producing a dial 1 with a satisfactory appearance. Cleaning operations with a cleaner can thus be omitted and production efficiency can be improved.

An even more satisfactory appearance can be ensured because the bonding agent 7 is easily separated from the peripheral portions of the dial members 2 when the transfer sheet 6 is peeled off, and the bonding agent 7 does not overflow in the peripheral portions of the dial members 2.

Furthermore, according to this method, the adhesion of foreign matter can be more reliably prevented because the bonding agent 7 is cured while the transfer sheet 6 is covered.

(d) The dial members 2 are formed by electroforming/plating, but need not be limited thereto and may also be formed, for example, by coat application or printing. When the dial members 2 are formed by coat application, the coating in the present embodiment is applied to the plated portion 9A and hardened to form the dial members. In this case, the thickness of the resist agent 10 provided to the base 9 should be set greater than in the case of electroforming/plating. For example, the thickness of the resist agent 10 should be 150 μm or greater. Also in this case, the resist agent 10 does not need to be a nonconductive material, and the base 9 need not be a conductive material. A film is preferably formed in layers to give the resist agent 10 a thick structure.

When the dial members 2 are formed by printing, the resist agent 10 need not be formed and the base 9 does not need to be a conductive material.

(e) The steps involved in the manufacture of the dial 1 are not limited to manual operations and may be automated with machinery or the like. For example, the steps for attaching the transfer sheet 6 to the dial members 2 may include supplying the transfer sheet 6 to a roller and automatically attaching the transfer sheet 6 to the dial members 2. The dial members 2 may also be attached to the dial base 4 automatically by a robot or the like.

(f) In the above-mentioned embodiment, the dial label 3 is formed into a flat sheet shape, but the shape of the dial label 3 is not limited thereto. For example, when the dial members 2 are attached to a curved surface, a dial label 3 should be formed with a curved surface matching the aforementioned curved surface. If this is done, the formed dial members 2 are satisfactorily bonded in accordance with the curved surface.

(g) In the above-mentioned embodiment, the masking layer 12 was provided in the process for manufacturing the sheet-like adhesive label, but the dial members 2 can be formed even if the masking layer 12 is not provided. However, when the masking layer 12 is provided, the consumption of plating can be reduced because plating is not formed on the corresponding portion. Consequently, it is possible to increase the electric current density in the portion of the dial 1 to be subjected to overlaying plating, so the thickness of the salvage plating of the dial members 2 can be increased and three-dimensional decorative properties can be improved.

(h) The adhesive is not limited to those of a solvent-based self-bonding type, water-soluble self-bonding type, or UV self-bonding type as previously described, and any adhesive may be used as long as the desired adhesion can be obtained. The curing agent is not limited to those of a UV curing type or heat curing type as previously described, and any curing agent may be used as long as the phase of the bonding agent 7 can be irreversibly changed to a solid state.

(i) In the above-mentioned embodiment, the bonding agent 7 was applied to the entire transfer sheet 6, but the present invention is not limited thereto. It is possible, for example, that only the bonding surfaces 2A of the dial members 2 are coated by some other method. In this case, the bonding agent 7 is applied only to the bonding surfaces 2A, so the bonding agent 7 does not remain on the portions of the dial base 4 devoid of the dial members 2 when the transfer sheet 6 is peeled off. Therefore, the dial 1 has a satisfactory appearance. The consumption of the bonding agent 7 can be reduced because the bonding agent 7 is applied only to the necessary portions.

(j) The attachment member of the present invention includes the dial members 2 attached to the dial 1 of the timepiece in the present embodiment, but is not limited thereto. For example, the present invention can be applied to a manufacturer's name, product name, or other such logo or marking attached to a product; a warning label or other decorative design; or any other item attached to a surface.

(k) The surface to which the attachment member was attached was one surface of the dial 1 visible from the exterior, but the present invention is not limited thereto. In other words, depending on the intended use of an adherend, the attachment member may be attached to both surfaces of the adherend, or rather may be attached to at least one surface of the adherend. The area to which the attachment member is attached is not limited to part of the adherend, but may be the entire surface.

(l) The material of the adherend was the dial base 4 that formed the dial 1 of the timepiece in the present embodiment, but this option is not limiting. For example, the adherend may be a television or other such electric product; an office product; a decorative article; or any other product in which an adhesive product is attached to a surface. Furthermore, the present invention can also be applied to the cover glass, case, band, or winder of a timepiece.

According to the sheet-like adhesive label and attachment method of the present invention, the adhesion of foreign matter can be prevented and the appearance can be improved, so the present invention can be used in products in which a manufacturer's name, product name, and other such logos or markings or decorative articles need to be attached. Examples include televisions and other such electric components, office supplies, decorative articles, and the like.

The dial of the present invention can be used in wristwatches, standing clocks, other such timepieces, and the like.

As used above, "front," "rear," "above," "below," "vertical," "horizontal," "slanted," and other such directional terms indicate the direction of the sheet-like adhesive label, the dial, and the timepiece. Therefore, the terms indicating these directions should be interpreted relative to the sheet-like adhesive label, the dial, and the timepiece.

As used above, "substantially," "about," "mostly," and other such terms expressing extent indicate a moderate amount of error that does not result in consequential changes. These terms expressing extent should be interpreted to include an error of at least ±5% as long as the error does not bring about any consequential changes.

This Specification claims priority of Japanese Patent Application Nos. 2002-172775 and 2002-172776. The entire disclosure of Japanese Patent Application Nos. 2002-172775 and 2002-172776 is incorporate herein by reference.

Although only parts of the embodiments of the present invention are described above, it is made clear to those skilled in the art by the above-mentioned disclosures that it is possible to add various changes to the above-mentioned embodiments without departing from the scope of the present invention as defined in the claims. Furthermore, the above-mentioned embodiments are only intended to describe the present invention and do not limit the scope of the present invention as defined by the claims hereinafter described or any equivalents thereof.

What is claimed is:

1. A sheet-like adhesive label adapted to be bonded to at least one surface of an adherend, comprising:

a bonding portion adapted to be attached to the surface of the adherend and having an upper surface containing a U-shaped structure comprising a planar with upstanding sidewall;

an attachment member having a first planar bottom bonding surface directly and completely contacting said bonding portion planar base, being formed by electroforming, and further having, a convex portion having an arcuate cross section located opposite said first bonding surface portion, said convex portion having a second bonding surface directly contacting said bonding portion, and said second bonding surface extending outwardly from said said convex portion and toward said bonding portion and is adhered to said bonding portion;

a release sheet being attached to a lower exposed surface of said bonding portion of said attachment member; and a transfer sheet being attached to a side of said attachment member opposite from a side provided with said release sheet, said bonding portion including an adhesive to attach said attachment member to the adherend, and an irreversible phase transition agent to phase-transform irreversibly at least part of said adhesive to a solid state by setting or curing.

2. The sheet-like adhesive label according to claim 1, wherein said adhesive is either a solvent-based self-bonding adhesive, which adjusts its adhesiveness by volatizing a solvent, a water-soluble self-bonding adhesive, which adjusts its adhesiveness by evaporating water, or a UV self-bonding adhesive, which adjusts its adhesiveness by irradiation with ultraviolet rays (UV).

3. The sheet-like adhesive label according to claim 1, wherein said irreversible phase transition agent is either a UV-curing type curing agent, which promotes solidification by irradiation with ultraviolet rays (UV), or a heat curing type setting agent, which promotes solidification by heating.

* * * * *